July 23, 1946.   B. WALKER   2,404,418
NONCOMBUSTIBLE FUEL TANK
Filed Oct. 5, 1942

Inventor
Brooks Walker

By G. J. Kessenich & W. E. Thibodeau
Attorneys

Patented July 23, 1946

2,404,418

UNITED STATES PATENT OFFICE 2,404,418

NONCOMBUSTIBLE FUEL TANK

Brooks Walker, Piedmont, Calif.

Application October 5, 1942, Serial No. 460,816

1 Claim. (Cl. 220—88)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a fireproof fuel storage tank, such as might be used in fighting aircraft or in combat vehicles, although its application is not necessarily restricted to such types.

The fuel tank of a self-powered combat vehicle is probably one of its most vulnerable parts, whether that vehicle is a surface type or operates in the air. A bullet through the fuel tank subjects the occupants to at least two risks: that of loss of the fuel and consequent immobilizing of the vehicle, and the risk of fire arising from the escaping fuel.

It is the object of this invention to provide a storage tank for combustible fuels which reduces the fire hazard of a pierced tank to substantially nothing, and which prevents loss of the fuel in spite of a few bullet holes. A double-walled tank is provided, with liquid connections to the container and the space between the double walls. A liner of a rubber-like material for the space between the double walls serves to seal a bullet hole almost as fast as it is made.

Another object is to provide a fuel container, which while possessing self-sealing characteristics under all conditions, may be wholly or partially collapsed by the weight of the fuel in filling or partially filling the tank so as to utilize substantially the full fuel capacity of the sustaining envelope, and thereafter, when occasion requires, be inflated, as for instance when a plane upon which the tank is mounted, goes into combat.

Figure 1:
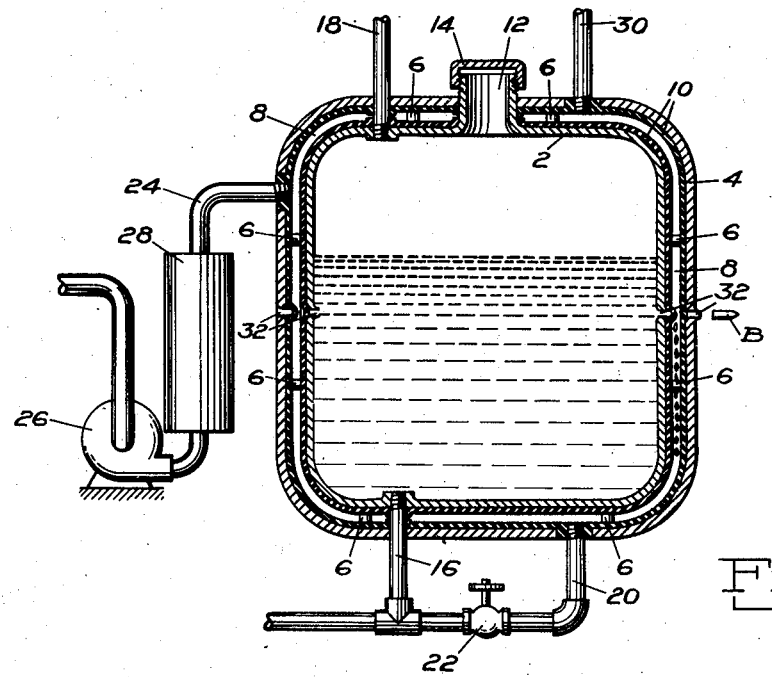

The specific nature of the invention as well as other objects and advantages thereof will clearly appear from a description of a preferred embodiment as shown in the accompanying drawing in which:

Fig. 1 of the drawing shows a fuel tank in section, made according to the invention.

Figure 2:
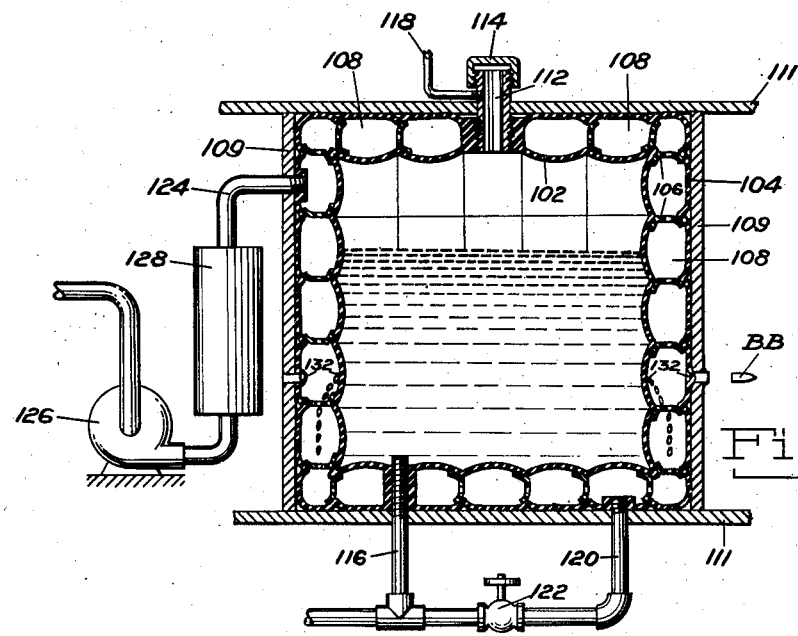

Fig. 2 is a view, also in section, of another embodiment of the invention.

Referring particularly to Fig. 1, a fuel storage tank is shown made up of a container 2 and a surrounding envelope 4 spaced therefrom by braces 6. Container 2 and envelope 4 will be made of any suitable relatively rigid or non-yielding material, preferably a metal. The space 8 between the resultant double-walled tank is lined with a resilient, elastic substance 10 such as rubber or leather, although it will usually be found that a rubber-like material is preferable. Although part of the invention can be practiced with a single layer of lining 10, two layers as shown are preferred. Container 2 has a conventional filler opening 12 covered by a cap 14. A pipe connection 16 permits draining liquid from the tank, and pipe 18 serves to vent the space above the liquid to atmosphere, or whatever other disposition may be made of the vented products.

The rubber-lined space between the two walls is provided with a liquid drain connection 20, which may if desired be piped into the main liquid drain 16 through a valve 22. A connection 24 is provided to space 8 to permit the introduction of a gas under pressure. This gas should be an inert, or incombustible gas, such as the exhaust gas from an internal combustion engine. The gas pressure should preferably be greater than that of a full head of fuel—i. e., it should be great enough to tend to prevent leakage of fuel out of container 2 into space 10 in case the tank is pierced. To insure against leakage, the gas pressure should be approximately twice that exerted by a full fuel tank at the bottom of the tank. Thus a margin of safety will be provided to take care of increases in liquid pressure caused by "bumps," pulling out of dives, and the like. The lesser pressure will, of course, also serve to retard such leakage, but will serve less well than a pressure equal to twice that of the static head of a full tank. A blower 26 is provided to boost the pressure of the exhaust gas to a predetermined minimum. The blower should have a capacity sufficient to sustain the desired pressure even in the presence of a few bullet holes. It should be noted here that provision will be made so that the blower can be started up by the pilot as the plane goes into combat or when the tank is punctured, rather than waste power by running the blower continuously. Any suitable dehydrator or moisture trap 28 is preferably provided to ensure that the gas going into space 10 is dry. A connection 30 may be provided to relieve space 10 of pressure in excess of the aforesaid predetermined minimum.

The embodiment shown in Fig. 2 differs somewhat from that shown in Fig. 1. In Fig. 2, a container 102, of preferably, a rubber-like substance is surrounded by an envelope 104 of a similar substance. The two walls 102 and 104 are secured together at spaced intervals by ties 106 which preferably provide free fluid communication throughout the space 108. The tank thus formed is shown as built into and confined by a compartment which may, for example, be the bulkheads 109 and sides 111 of a ship.

A filler opening 112 covered by a cap 114 is provided. The tank is emptied through a drain 116 and is vented through a pipe 118. Space 108 may be drained by a connection 120 which may be piped into drain 116 through a valve 122.

Connection 124 permits the introduction under pressure of an inert gas from a blower 126. A dehydrator 128 is preferably provided in the line.

*Operation.*—So long as the combat craft is undisturbed, fuel is withdrawn from the tank through the drain 16 or 116. If a bullet B or BB pierces the tank, as shown at 32 or 132, inert gas from space 8 or 108 pours through the hole, retarding the flow of liquid out of container 2 or 102. The bullet will make a rather sharp or clean hole through the metal walls of Fig. 1 or the bulkhead of Fig. 2. However, the rubber tends to seal these holes, acting very much as a stopper, thus further retarding fluid flow through them. Furthermore, besides the stopper-like action of the rubber, it will often be found that the hole in the rubber (or other material) does not line up with the hole in the tank. To assist this phenomenon, the yieldable lining material may if desired be put in place under tension.

If a substantial quantity of fluid should succeed in leaking out of container 2 or 102, it is still not a total loss, for it is substantially confined in space 8 or 108. Note that the fire hazard is thus materially reduced. Furthermore, in case it becomes necessary for continued operation of the craft to use the fuel which has leaked into the space between the two walls, valve 22 or 122 may be opened, automatically by means not shown, or manually.

I claim:

In combination, a double-walled supply tank for supplying fuel to an engine, said tank having a highly flexible outer casing, an inner flexible self-sealing casing, said inner and outer casings being secured together by separating elements, said casings forming the top, bottom and side walls of said fuel tank, said outer casing having an opening connected to the exhaust of an engine, said bottom wall of said outer casing having an opening connected to the fuel supply of said engine to utilize fuel that may leak into the space between said casings, and means for supplying the exhaust gases to the space between the casings at pressures above the main exhaust pipe pressures and atmospheric pressure.

BROOKS WALKER.